United States Patent [19]

Miks et al.

[11] Patent Number: 5,346,512
[45] Date of Patent: Sep. 13, 1994

[54] CARBON TREATMENT OF RECLAIMED AMMONIUM PERCHLORATE

[75] Inventors: Kathryh F. Miks, North Ogden; Dennis J. Fife, Brigham City; Steven J. Bradley, North Ogden, all of Utah

[73] Assignee: Thiokol Corporation, Ogden, Utah

[21] Appl. No.: 102,584

[22] Filed: Aug. 5, 1993

[51] Int. Cl.$^5$ ............................................. C01C 1/28
[52] U.S. Cl. .................................... 23/302 A; 149/76; 149/124; 423/476
[58] Field of Search ............... 149/76, 124; 23/302 A; 423/476

[56] References Cited

U.S. PATENT DOCUMENTS

| | | | |
|---|---|---|---|
| 3,172,793 | 3/1965 | Markowitz | 423/476 |
| 3,383,180 | 5/1968 | Kralik et al. | 23/302 A |
| 3,419,899 | 12/1968 | Tufts et al. | 23/302 A |
| 3,451,789 | 6/1969 | McIntosh | 23/302 |
| 3,498,759 | 3/1970 | Kralik | 23/302 A |
| 3,728,086 | 4/1973 | Adicoff | 23/302 A |
| 3,819,336 | 6/1974 | Rogers et al. | 23/302 A |
| 4,023,935 | 5/1977 | Levinthal et al. | 23/302 A |
| 4,057,442 | 11/1977 | Shaw et al. | 149/109.4 |
| 4,098,627 | 7/1978 | Tompa et al. | 149/109.6 |
| 4,198,209 | 4/1980 | Shaw et al. | 23/302 R |
| 4,662,893 | 5/1987 | McIntosh | 23/293 |
| 4,793,866 | 12/1988 | McIntosh | 134/24 |
| 4,854,982 | 8/1989 | Melvin et al. | 149/109.6 |

FOREIGN PATENT DOCUMENTS

| | | | |
|---|---|---|---|
| 2332938 | 1/1975 | Fed. Rep. of Germany | 423/476 |
| 2353360 | 5/1975 | Fed. Rep. of Germany | 423/476 |

*Primary Examiner*—Wayne Langel
*Attorney, Agent, or Firm*—Madson & Metcalf

[57] ABSTRACT

A process for treating reclaimed ammonium perchlorate with carbon to produce rounded particles upon recrystallization is disclosed. In the process, a recovered ammonium perchlorate solution is contacted with activated carbon, preferably by passage through a packed column. Contamination that modifies the ammonium perchlorate crystal habit and causes rhombic-shaped ammonium perchlorate particles is removed by activated carbon. The carbon-treated ammonium perchlorate solution produces rounded AP particles upon recrystallization with mechanical agitation.

17 Claims, 1 Drawing Sheet

CARBON TREATMENT OF RECLAIMED AMMONIUM PERCHLORATE

BACKGROUND OF THE INVENTION

1. Field of the Invention

This invention relates to reclamation of ammonium perchlorate from solid rocket propellants. More specifically, the present invention relates to the treatment of reclaimed ammonium perchlorate with activated carbon to produce rounded ammonium perchlorate particles upon recrystallization while agitating the solution.

2. Technology Review

There is a considerable amount of waste propellant produced during the manufacture of solid propellant rocket motors. Sources of waste propellant include the excess propellant cast into the motor casing to compensate for shrinkage, rocket motors or masterbatches that do not meet specifications, as well as overage motors removed from service. In the past, this waste propellant has been disposed by open burning. More recently, efforts have been made to recover oxidizer, metallic fuel, and other valuable propellant ingredients.

Various processes for recovering oxidizer from waste propellant material are known in the art. A common technique involves leaching the oxidizer with a solvent such as hot water. The oxidizer, usually ammonium perchlorate (AP), dissolves in the solvent permitting separation of insoluble ingredients. The AP is then recovered by crystallization. The reclaimed AP is then recrystallized and mechanically rounded in order to meet solid rocket propellant particle size distribution and shape requirements.

Recrystallization from merely lowering the AP solution temperature or exceeding solution saturation limits does not produce rounded particles. The required rounding is mechanically induced. It has been found that AP reclaimed and recrystallized from certain solid propellants produces atypical, rhombic-shaped particles which are inadequately rounded by the normal mechanical rounding process. Subsequent propellant evaluations with the reclaimed/recrystallized AP indicate that the atypical particle shape makes the propellant difficult to process and alters propellant mechanical and ballistic properties.

It will be appreciated that there is a need in the art for a process of reclaiming waste AP which will produce normal, rounded AP particles upon recrystallization. Such process is disclosed and claimed herein.

SUMMARY OF THE INVENTION

The present invention is directed to a process for treating reclaimed ammonium perchlorate with activated carbon to produce rounded particles upon recrystallization. In the process, contamination that modifies the AP crystal habit and causes rhombic-shaped AP particles is removed by activated carbon. The AP solution is typically obtained from waste solid propellant by leaching with hot water. The activated carbon may be in a packed carbon column or other similar liquid/solid contacting device. It has been found that there is a threshold contacting time required to purify the AP solution. It is recommended that the AP solution contact the activated carbon for at least 1 minute, and preferably for at least 3 minutes. To prevent premature precipitation of AP particles, the AP solution and the activated carbon are preferably heated. The carbon treated AP solution is then recrystallized, yielding rounded AP particles. Recrystallization is usually accomplished by cooling or saturating the AP solution while mechanically agitating. The performance and processing of the reclaimed AP particles in propellant formulations is comparable to virgin AP.

DETAILED DESCRIPTION OF THE INVENTION

The present invention is directed to a process for treating reclaimed ammonium perchlorate (AP) with activated carbon to produce rounded particles upon recrystallization. Recovered AP solution is contacted with activated carbon to remove contamination that causes atypical rhombic-shaped AP particles. Upon recrystallization with mechanical agitation, the resulting AP particles are round in shape.

Various processes are known to those skilled in the art for recovering AP from waste propellant. However, the AP solution is typically recovered from waste solid propellant by leaching. For example, U.S. Pat. No. 4,198,209 to Shaw et al. discloses a process of recovering AP from waste solid propellant by leaching shredded propellant particles with a high temperature leach solution. Related processes of recovering AP from waste propellant are disclosed in U.S. Pat. Nos. 3,451,789 to M.J. Mcintosh, 4,057,442 to Shaw et al., 4,098,627 to Tompa et al., and 4,854,982 to Melvin et al.

The AP solution is typically maintained at a high temperature to prevent premature precipitation of the AP. Because the concentration of AP in solution is temperature dependent, high temperatures permit greater AP concentrations. Thus, a concentrated AP solution must be heated to prevent AP from precipitating and clogging process equipment.

The activated carbon may be in a packed carbon column or other similar liquid/solid contacting device. Suitable packed columns are commercially available and well known to those skilled in the art. It is recommended that the carbon column be heated when processing concentrated AP solution to prevent AP from precipitating in the column.

It has been found that there is a threshold contacting time required to purify the AP solution. It is currently recommended that the AP solution contact the activated carbon for at least 1 minute, and preferably more than 3 minutes. As the activated carbon is used, its effectiveness decreases. Spent activated carbon may be regenerated by high temperature pyrolysis. In initial bench scale studies, it was observed that approximately 1 kg activated carbon would successfully process about 63 kg AP. In later bench scale studies, the AP:Carbon ratio was found to be even higher, about 200:1.

Once the AP solution has been treated by the activated carbon, the AP is recrystallized to yield rounded AP particles. Recrystallization is usually accomplished by exceeding the AP saturation limit, by cooling the AP solution or by increasing the concentration of AP in the solution, while mechanically agitating.

As will be described more fully in the following examples, the performance, processing, and mechanical properties of propellant formulations prepared from reclaimed AP particles are comparable to propellants prepared from virgin AP.

Figure 1:
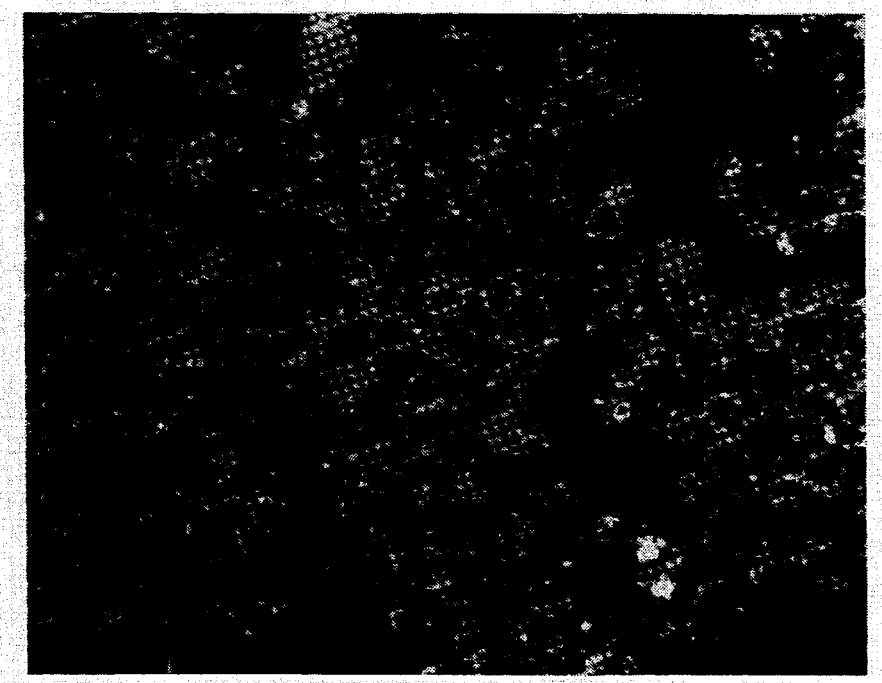
FIG. 1 is a photomicrograph of recrystallized AP particles (12× magnification) obtained from an AP solution treated with activated carbon.
Figure 2:
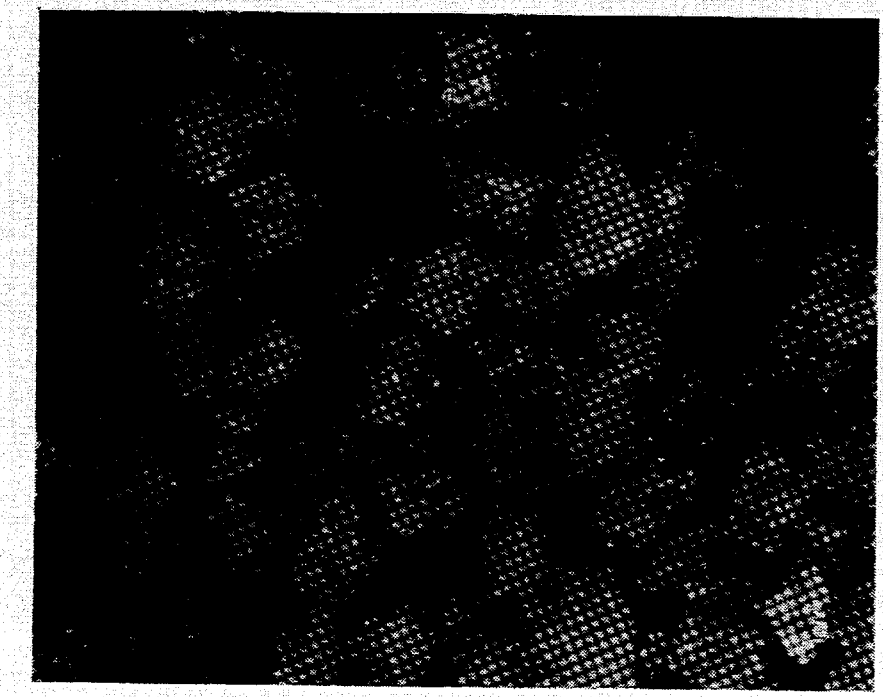
FIG. 2 is a photomicrograph of recrystallized AP particles (12× magnification) obtained from an AP solution without activated carbon treatment.

FIGS. 1 and 2 illustrate reclaimed and recrystallized AP particles, at 12× magnification. The AP particles of FIG. 1 were treated with activated carbon, while the AP particles of FIG. 2 were not treated with activated carbon. It is apparent from FIGS. 1 and 2 that the process of the present invention results in rounded AP particles.

The following examples are offered to further illustrate the present invention. These examples are intended to be purely exemplary and should not be viewed as a limitation on any claimed embodiment.

EXAMPLE 1

Several different waste propellants were subjected to a standard AP recovery process to determine the shape of the reclaimed and recrystallized AP particles. The propellant formulations are typical of those known and used in the industry. Each formulation contains a polymeric binder system in the range from 8.9% to 14% (by weight), AP in the range from about 68.9% to 73% (by weight), AP in the range from about 15.1% to 19% (by weight), and small amounts (less than 3%, by weight) of various additives commonly used in the art, such as burn rate modifiers, cure catalysts, and bonding agents. The propellant formulations are set forth below:

TABLE 1

| Ingredient | Propellant Formulation | | | |
|---|---|---|---|---|
| | A wt. % | B wt. % | C wt. % | D wt. % |
| PBAN binder & Epoxy curative | 14.00 | | | |
| HTPB binder & IPDI curative | | 11.80 | 10.7 | |
| CTPB binder & BITA curative | | | | 8.925 |
| TPB | | 0.01 | | |
| TEPANOL | | 0.15 | | |
| ODI | | 0.04 | | |
| DOA | | | 1.00 | |
| HX-752 | | | 0.30 | |
| Polybutene | | | | 2.975 |
| Fe$_2$O$_3$ | 0.30 | | 0.10 | |
| Al | 16.00 | 19.00 | 19.00 | 15.100 |
| AP | 69.70 | 69.00 | 68.90 | 73.000 |

AP was extracted from Propellant Formulations A, B, C, and D by placing approximately 11.3 pounds of the desired propellant millings in a 5-gallon reactor with 2.5 gallons of water. The slurry was heated to, and held at 160° F. while being agitated. The hot concentrated solution was filtered through a coarse screen and a 25-micron filter. The concentrated solution was cooled to ambient temperature, and the AP was recovered via 25-micron filtration.

Recrystallization of reclaimed AP was accomplished by dissolving 1 kilogram of reclaimed AP in 2 liters of distilled water. The solution was heated to 185° F. (85° C.) and held for 15 minutes while agitating. The solution was cooled, while agitating, to 104° F. (40° C.) at a rate of approximately 100° F./hour (40° C./hour). The AP was recovered via 25 micron filtration and dried with an acetone wash. The resulting AP particle shape was examined.

This reclamation/recrystallization procedure was repeated for each propellant type in normal plant water (P. Water) and in distilled water (D. Water). The results are summarized below in Table 2.

TABLE 2

| Propellant AP Source | Extraction Temperature | Extraction Solvent | Particle Shape |
|---|---|---|---|
| A | 160° F. | D. Water | Round-edged rhombic |
| A | 160° F. | P. Water | Round-edged rhombic |
| A | 100° F. | D. Water | Round-edged rhombic |
| B | 160° F. | D. Water | Roundish |
| B | 160° F. | P. Water | Roundish |
| C | 160° F. | D. Water | Roundish |
| C | 160° F. | P. Water | Roundish |
| D | 160° F. | D. Water | Sharp-edqed rhombic |
| D | 160° F. | P. Water | Sharp-edged rhombic |
| D | 100° F. | D. Water | Roundish |

The data depicted in Table 2 suggest that the particle shape is independent of extraction water source. Typical rounded AP particles can be processed from Formulations B and C extracted at 160° F. Uncharacteristic sharp-edged rhombic-shaped particles were processed from Formulation D extracted at 160° F. However, the experiment was repeated at an extraction temperature of 100° F. and produced typical rounded particles. AP particles reclaimed and recrystallized from Formulation A produced atypical round-edged rhombic shaped particles in plant or distilled water at either a 160° F. or 100° F. extraction temperature. It was noted that the propellant formulations A and D which produced the irregular shaped AP particles have carboxy functional binder systems. It was concluded that one or more very low level organic contaminants were functioning as a crystal modifier and preventing particle rounding. Thus, the present invention was developed to remove the organic contamination from the recovered AP prior to recrystallization.

EXAMPLE 2

AP was extracted from propellant formulation A and filtered as described in Example 1. The solution was reheated to 160° F. A 2-inch by 24-inch double walled glass column containing activated carbon was preheated to 160° F. with a copper tubing water jacket to ensure that the AP would not precipitate in the carbon column. The column was packed with DARCO activated virgin carbon manufactured by the American Norit Company. The column was positioned vertically, and the solution was pumped up through the column at a rate of approximately 380 ml/minute, resulting in approximately a 3-minute residence time. The solution was cooled to ambient temperature, and the AP was recovered via 25-micron filtration. The AP was recrystallized according to Example 1. Nominal, well-rounded AP particles resulted.

EXAMPLE 3

AP was extracted from propellant formulations A, B, and C in a large scale process similar to that described in Example 1. AP (8.34 pounds) was dissolved in 2 gallons of distilled water to result in 50% AP concentration, by weight. The solution was heated to and held at 185° F. (85° C.) for 15 minutes while mixing slowly. The solution was pumped through the carbon column of Example 2 at a rate of approximately 215 ml/minute, resulting in approximately 5.5 minute residence time. A 2 liter sample was collected, reheated to 185° F., and recrystallized according to the procedure described in Example 1. Nominal, well-rounded AP particles resulted.

EXAMPLE 4

AP was extracted from propellant formulations A, B, and C as described in Example 3. The reclaimed AP was dissolved in distilled water at 185° F. Part of the solution was filtered through the heated carbon column, described in Example 2, at a flow rate of approximately 230 ml/minute. AP was recrystallized from the hot concentrated solution by cooling. AP particles that had been filtered through the carbon column were rounded (FIG. 1), while those that had not been filtered through the carbon column were rhombic (FIG. 2).

EXAMPLES 5-14

Subsequent runs were made according to the procedure of Example 3, except with varying flow rates to determine the maximum flow rate/minimum residence time required for effective treatment. Flow rates between approximately 215 and 1150 ml/minute (5.5 and 1.0 minute residence time) were evaluated. The results are set forth below in Table 3:

TABLE 3

| Ex. | Water | Formulation | Flow (ml/min) | Vol. (gal) | Res. Time (min) | Conc. (g/ml) | Particle Shape |
|---|---|---|---|---|---|---|---|
| 5[a] | D | A | 378 | 3 | 3.07 | 0.36 | Roundish |
| 6 | D | A,B,C | 214 | 2 | 5.41 | 0.5 | Roundish |
| 7 | D | A,B,C | 300 | 4.5 | 3.86 | 0.32 | Roundish |
| 8 | D/P[b] | A,B,C | 1154 | 1 | 1.00 | 0.5 | Some Rhombic |
| 9 | D/P[b] | A,B,C | 870 | 1 | 1.33 | 0.5 | Roundish |
| 10 | D/P[b] | A,B,C | 458 | 2 | 2.52 | 0.5 | Roundish |
| 11 | P | A,B,C | 400 | 4 | 2.90 | 0.5 | Roundish |
| 12[a] | P | D | ~870 | 4 | 1.33 | 0.38 | Roundish |
| 13 | P | A,B,C | ~870 | 4 | 1.33 | 0.5 | Mostly Rhombic |
| 14 | P | A,B,C | ~870 | 4 | 1.33 | 0.5 | Rhombic |

[a]lab scale extraction.
[b]90% distilled water/10% plant water.

According to the data depicted in Table 3, the fastest flow rate/shortest residence time that yielded round particles was. 870 ml/minute for a 1.33 minute residence time.

EXAMPLE 15

Safety tests were performed on recrystallized/reclaimed AP obtained from propellant formulation A, part of which had been treated with activated carbon and part of which had not been treated with activated carbon. The results were compared with those obtained from virgin AP. The safety testing used standard methodologies common the those skilled in the art. The safety tests included Thiokol Corporation (TC) tests for friction, impact, electrostatic discharge sensitivity, and thermal stability and Allegheny Ballistics laboratory (ABL) tests for friction, impact, and electrostatic sensitivity. It should be noted that TC tests are 50% values and ABL numbers are threshold initiation values. The safety test results are summarized in Table 4, below.

TABLE 4

AP Safety Analysis

| Safety Test | Virgin AP | Recrystallized/ Reclaimed AP, Carbon Treated | Recrystallized/ Reclaimed AP |
|---|---|---|---|
| TC indirect impact | 13–31 in. | 44.67 in. | 17 in. |
| ABL impact | 27–51 cm | 21–33 cm | |
| TC strip friction | >64 lb. | >64 lb. | |
| ABL sliding friction | 100 at 8 ft/s | 100 at 8 ft/s | |
| TC ESD | >8 J | >8 J | |
| ABL ESD | 1.25 J | 1.25–6.25 J | 6.25 J |
| TC autoignition SBAT* | 379° F. | 379° F. | 379° F. |

*Simulated Bulk Autoignition Temperature

The data depicted in Table 4 suggest that recrystallized/reclaimed AP were comparable to virgin material and indicate that the reclaimed AP is still classified as Greenline and presents no special shipping or handling problems over virgin 200-micron AP.

EXAMPLE 16

Rheological and Mechanical Properties of Propellant Mixes

Five-gallon size propellant mixes were prepared with carbon-treated recrystallized/reclaimed AP based upon propellant formulation A, above. Propellant mixes were processed with 100% reclaimed AP and 100% virgin AP. The end-of-mix (EOM) rheological properties for the reclaimed AP mixes were determined and were found to be comparable to the virgin AP control mixes and to the historical database for propellant formulation A. The rheological data indicate that propellant made with reclaimed AP has acceptable processing capability.

Cured mechanical properties were determined from two half-gallon loaf cartons cast from each mix. Cartons were cured for 96±4 hours at 135° F. and postcured for between 4 and 7 days prior to testing. The mechanical properties were determined from 12 JANNAF Class C tensile specimens tested at 2 ipm at ambient temperature and pressure. The measured mechanical properties for the reclaimed AP propellant are comparable to the virgin AP control propellant properties at the 95 percent confidence level (student-t test), and fall within the 3-sigma historical control limits established for propellant formulation A. At the propellant formulation required to meet target mechanical properties (stress value of 110 psi), the following properties are predicted for virgin AP and reclaimed AP propellant:

| AP Source | % HB | $\sigma_m$ (psi) | $E^{2.6}$ (psi) | $\epsilon_m$ (%) |
|---|---|---|---|---|
| Virgin | 86.6 | 110 | 540 | 35.2 |
| Reclaimed | 86.8 | 110 | 519 | 34.6 |

The data indicate that acceptable maximum stress, modulus, and strain can be obtained from propellant formulated with reclaimed AP according to the present invention.

EXAMPLE 17

Ballistic Properties

Five-gallon size propellant mixes were prepared according to Example 16. Uncured ballistic properties were determined via liquid strand burn rate (LSBR) analyses performed at 1500 psig and 100° F. The regression equations of the LSBR for the reclaimed AP and control propellant mixes are listed below:

Virgin AP: LSBR(ips)=$0.4752 + 0.2600$(% $Fe_2O_3$), $R^2 = 0.996$

Reclaimed AP: LSBR(ips)=$0.4802 + 0.2475$(% $Fe_2O_3$), $R^2 = 0.988$

The reclaimed AP propellant LSBR regression equation was compared to both the control and historical regression equations for propellant formulation A. The slope and intercept are comparable to the control at the 95 percent confidence level (student-t test) and fall well within the historical 3-sigma control limits for propellant formulation A.

Cured ballistic properties were determined from three 5-inch C.P. (center perforated) motors cast for each mix and cured for 96±4 hours at 135° F. The motors were tested at 60° F. and 625 psia. Regression equations representing burn rate as a function of ferric oxide content were determined and are set forth below:

Virgin AP: $R_b$(ips)=$0.330 + 0.122$(% $Fe_2O_3$), $R^2 = 0.991$

Reclaimed AP: $R_b$(ips)=$0.337 + 0.126$(% $Fe_2O_3$), $R^2 = 0.989$

The reclaimed AP propellant 5-inch C.P. motor equations were compared to both the control and historical regression equations. The slope and intercept are comparable to the control at the 95 percent confidence level (student-t test) and fall within the historical 3-sigma control limits.

The target burn rate for propellant formulation A is 0.363 ips at 625 psia and 60° F., as measured by 5-inch C.P. (center perforated) motors. Applying the target burn rate of 0.363 ips to the appropriate regression equations above gives iron oxide levels of 0.271 and 0.207 percent for the virgin AP and reclaimed AP propellant mixes, respectively. The reclaimed AP propellant iron oxide level required to meet target ballistic properties was compared to both the control and historical iron oxide levels. The iron oxide level is comparable to the control at the 95 percent confidence level (student-t test) and falls within the historical 3-sigma control limits. The data indicate that acceptable ballistic property requirements can be achieved with propellant processed from reclaimed AP according to the present invention.

From the foregoing it will be appreciated that the present invention provides a process of reclaiming waste AP which produces normal, rounded AP particles upon recrystallization which may be successfully used in solid propellant rocket formulations.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A process of reclaiming ammonium perchlorate comprising the steps of:
    (a) obtaining an ammonium perchlorate solution;
    (b) contacting the ammonium perchlorate solution with activated carbon; and
    (c) recrystallizing the ammonium perchlorate solution.

2. A process of reclaiming ammonium perchlorate as defined in claim 1, wherein the ammonium perchlorate solution is recovered from waste solid rocket propellant.

3. A process of reclaiming ammonium perchlorate as defined in claim 2, wherein the ammonium perchlorate solution is recovered from waste solid rocket propellant by leaching ammonium perchlorate from the propellant.

4. A process of reclaiming ammonium perchlorate as defined in claim 1, wherein the ammonium perchlorate solution contains contaminants capable of modifying the ammonium perchlorate crystal habit and forming atypical shaped ammonium perchlorate particles upon recrystallization.

5. A process of reclaiming ammonium perchlorate as defined in claim 1, wherein the ammonium perchlorate solution has a residence time in contact with the activated carbon greater than about 1 minute.

6. A process of reclaiming ammonium perchlorate as defined in claim 1, wherein the ammonium perchlorate solution has a residence time in contact with the activated carbon greater than about 3 minutes.

7. A process of reclaiming ammonium perchlorate as defined in claim 1, wherein the ammonium perchlorate solution and the activated carbon are heated during the contacting step to prevent premature precipitation of ammonium perchlorate.

8. A process of reclaiming ammonium perchlorate as defined in claim 1, wherein the step of recrystallizing the ammonium perchlorate solution is accomplished by increasing the concentration of the ammonium perchlorate solution while agitating the solution.

9. A process of reclaiming ammonium perchlorate as defined in claim 1, wherein the step of recrystallizing the ammonium perchlorate solution is accomplished by cooling the ammonium perchlorate solution while agitating the solution.

10. A process of reclaiming ammonium perchlorate comprising the steps of:
    (a) obtaining an ammonium perchlorate solution containing contaminants capable of modifying the ammonium perchlorate crystal habit and forming atypical shaped ammonium perchlorate particles upon recrystallization;
    (b) contacting the ammonium perchlorate solution with activated carbon, wherein the ammonium perchlorate solution and the activated carbon are heated during the contacting step to prevent premature precipitation of ammonium perchlorate; and
    (c) exceeding the saturation limit of the ammonium perchlorate solution to cause recrystallization of ammonium perchlorate in the ammonium perchlorate solution.

11. A process of reclaiming ammonium perchlorate as defined in claim 10, wherein the ammonium perchlorate solution is mechanically agitated during recrystallization of ammonium perchlorate.

12. A process of reclaiming ammonium perchlorate as defined in claim 11, wherein the ammonium perchlorate solution is recovered from waste solid rocket propellant.

13. A process of reclaiming ammonium perchlorate as defined in claim 12, wherein the ammonium perchlorate solution is recovered from waste solid rocket propellant by leaching ammonium perchlorate from the propellant.

14. A process of reclaiming ammonium perchlorate as defined in claim 13, wherein the saturation limit of the ammonium perchlorate solution is exceeded by cooling the ammonium perchlorate solution.

15. A process of reclaiming ammonium perchlorate as defined in claim 13, wherein the saturation limit of the ammonium perchlorate solution is exceeded by increasing the concentration of the ammonium perchlorate solution.

16. A process of reclaiming ammonium perchlorate as defined in claim 13, wherein the ammonium perchlorate solution has a residence time in contact with the activated carbon greater than about 1 minute.

17. A process of reclaiming ammonium perchlorate as defined in claim 13, wherein the ammonium perchlorate solution has a residence time in contact with the activated carbon greater than about 3 minutes.

* * * * *

UNITED STATES PATENT AND TRADEMARK OFFICE
CERTIFICATE OF CORRECTION

PATENT NO. : 5,346,512
DATED : September 13, 1994
INVENTOR(S) : Kathryn F. Miks, et al.

It is certified that error appears in the above-identified patent and that said Letters Patent is hereby corrected as shown below:

Column 1, line 6, insert the following:

The technology covered by this patent was funded in part under contract no. F42650-91-C-0441, and the government has certain rights in this technology.

Signed and Sealed this

Fourteenth Day of March, 1995

*Attest:*

BRUCE LEHMAN

*Attesting Officer*     *Commissioner of Patents and Trademarks*